United States Patent
Yoshikawa

(10) Patent No.: US 11,520,400 B2
(45) Date of Patent: Dec. 6, 2022

(54) ELECTRONIC APPARATUS AND METHOD FOR CONTROLLING THE SAME

(71) Applicant: CANON KABUSHIKI KAISHA, Tokyo (JP)

(72) Inventor: Akio Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 17/121,018

(22) Filed: Dec. 14, 2020

(65) Prior Publication Data
US 2021/0191510 A1    Jun. 24, 2021

(30) Foreign Application Priority Data

Dec. 20, 2019 (JP) .............................. JP2019-230917

(51) Int. Cl.
G06F 3/01 (2006.01)
G06F 3/041 (2006.01)
G06V 40/19 (2022.01)

(52) U.S. Cl.
CPC ............ G06F 3/013 (2013.01); G06F 3/0412 (2013.01); G06V 40/19 (2022.01)

(58) Field of Classification Search
CPC .... G06F 3/013; G06F 3/03543; G06F 3/0412; G06F 3/042; G06F 3/04817; G06V 40/18; G06V 40/19
See application file for complete search history.

(56) References Cited

U.S. PATENT DOCUMENTS

2012/0272179 A1* 10/2012 Stafford .................. G06F 3/012
                                                                345/157
2019/0294312 A1*  9/2019 Rohrbach ............... G06F 3/017

FOREIGN PATENT DOCUMENTS

JP            6504058 B2    4/2019

* cited by examiner

*Primary Examiner* — Robin J Mishler
(74) *Attorney, Agent, or Firm* — Canon U.S.A., Inc. IP Division

(57) ABSTRACT

An electronic apparatus includes a reception unit configured to receive an eye gaze input based on an eye gaze of a user. In a case where the eye gaze input is received by the reception unit, a control unit performs control to move an indicator to a position based on the eye gaze input if an operation performed on an operation unit satisfies a first condition, not to move the indicator if the operation performed on the operation unit satisfies the first condition but does not satisfy a second condition after moving the indicator to the position based on the eye gaze input, and to move the indicator from the position based on the eye gaze input by a movement amount corresponding to an operation amount if the operation performed on the operation unit satisfies the second condition.

18 Claims, 6 Drawing Sheets

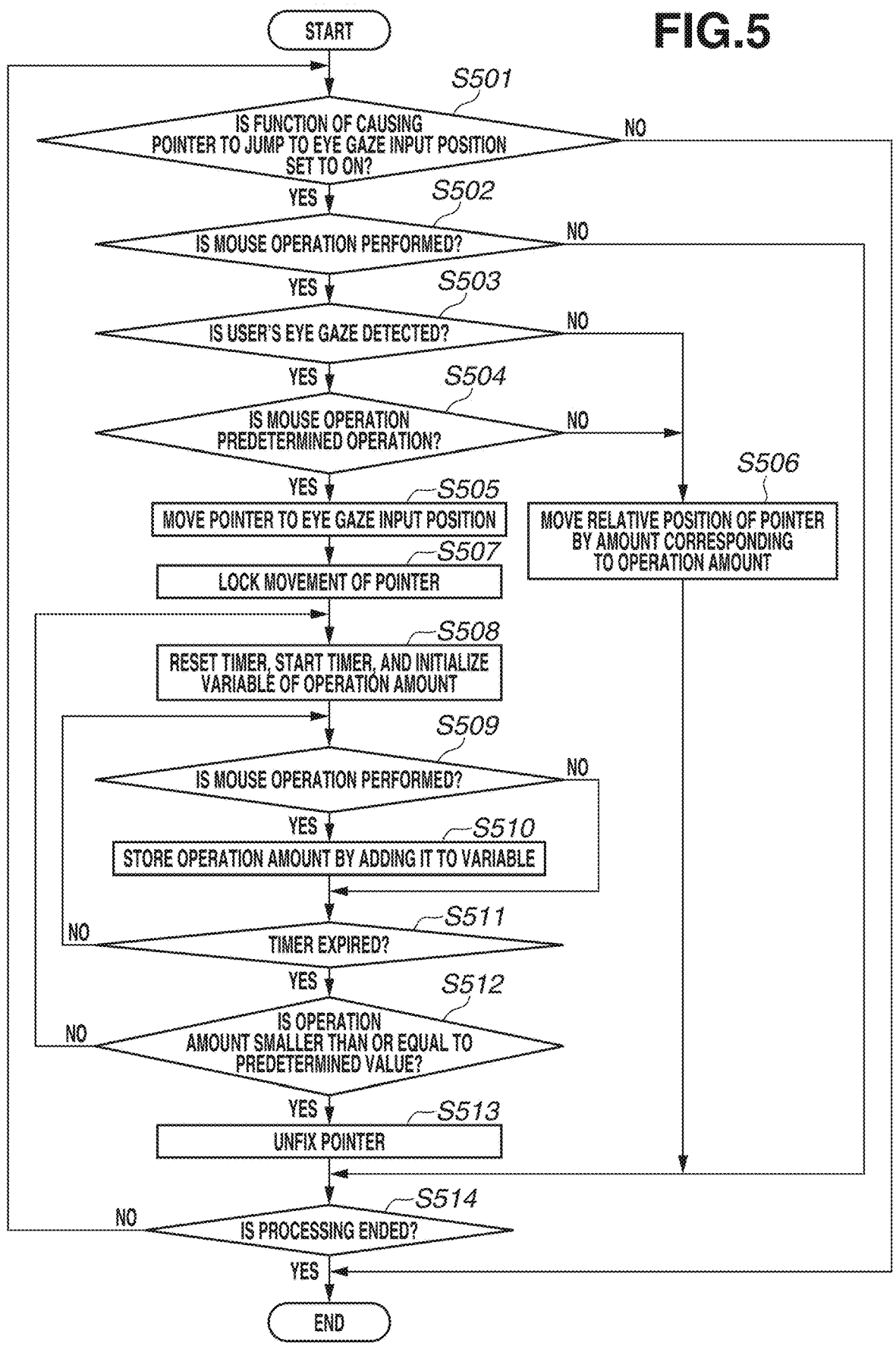

ELECTRONIC APPARATUS AND METHOD FOR CONTROLLING THE SAME

BACKGROUND

Field of the Disclosure

The present disclosure relates to an electronic apparatus that supports an eye gaze input based on an eye gaze of a user, and a method for controlling the electronic apparatus.

Description of the Related Art

Conventionally, there has been proposed an electronic apparatus configured to move a position of a mouse pointer with a mouse operation performed by a user. Further, in recent years, there has been known an electronic apparatus capable of detecting a direction of a user's eye gaze and displaying which region (position) the user has been looking at on the display. Japanese Patent No. 6504058 discusses that, when a user performs a specific operation on a pointing device, a pointer is moved to and displayed at a detected user's eye gaze input position and is fixed there for a predetermined time.

However, according to Japanese Patent No. 6504058, the pointer displayed on the display is moved in response to an operation performed on the pointing device when a predetermined time elapses after the mouse pointer is caused to jump based on the eye gaze. If the user continues the operation on the pointing device after the pointer is moved to the eye gaze input position and is unaware that the predetermined time has elapsed, the pointer is moved to a position different from a position desired by the user.

SUMMARY

The present disclosure is directed to improving usability after an indicator is moved to an eye gaze input position based on a user's eye gaze and a predetermined operation.

According to an aspect of the present invention, an electronic apparatus includes at least one memory and at least one processor, the at least one processor functioning as a reception unit configured to receive an eye gaze input based on an eye gaze of a user, and a control unit configured to control a movement of an indicator in response to an operation performed on an operation unit, wherein, in a case where the eye gaze input is received by the reception unit, the control unit performs control to move the indicator to a position based on the eye gaze input if the operation performed on the operation unit satisfies a first condition, not to move the indicator if the operation performed on the operation unit satisfies the first condition but does not satisfy a second condition after moving the indicator to the position based on the eye gaze input, and to move the indicator from the position based on the eye gaze input by a movement amount corresponding to an operation amount if the operation performed on the operation unit satisfies the second condition.

Further features of the present invention will become apparent from the following description of exemplary embodiments with reference to the attached drawings.

BRIEF DESCRIPTION OF THE DRAWINGS

FIG. 5 is a flowchart of control processing for controlling the pointer displayed on the display using the user's eye gaze input and the mouse.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present invention is applied. Thus, the present invention is in no way limited to the following exemplary embodiment.

Operation in each exemplary embodiment will be described below with reference to the drawings.

Figure 1:
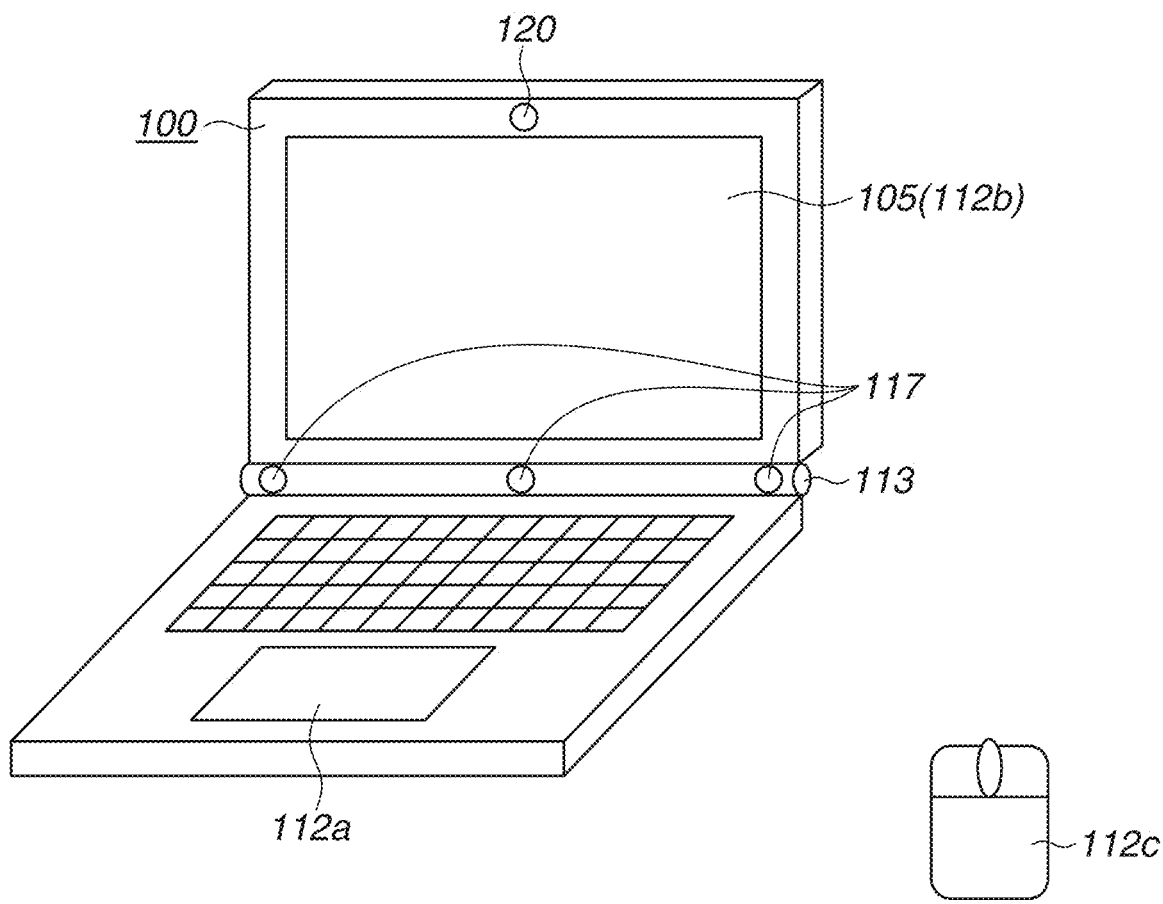
FIG. 1 illustrates an outer appearance of a personal computer.
Figure 2:
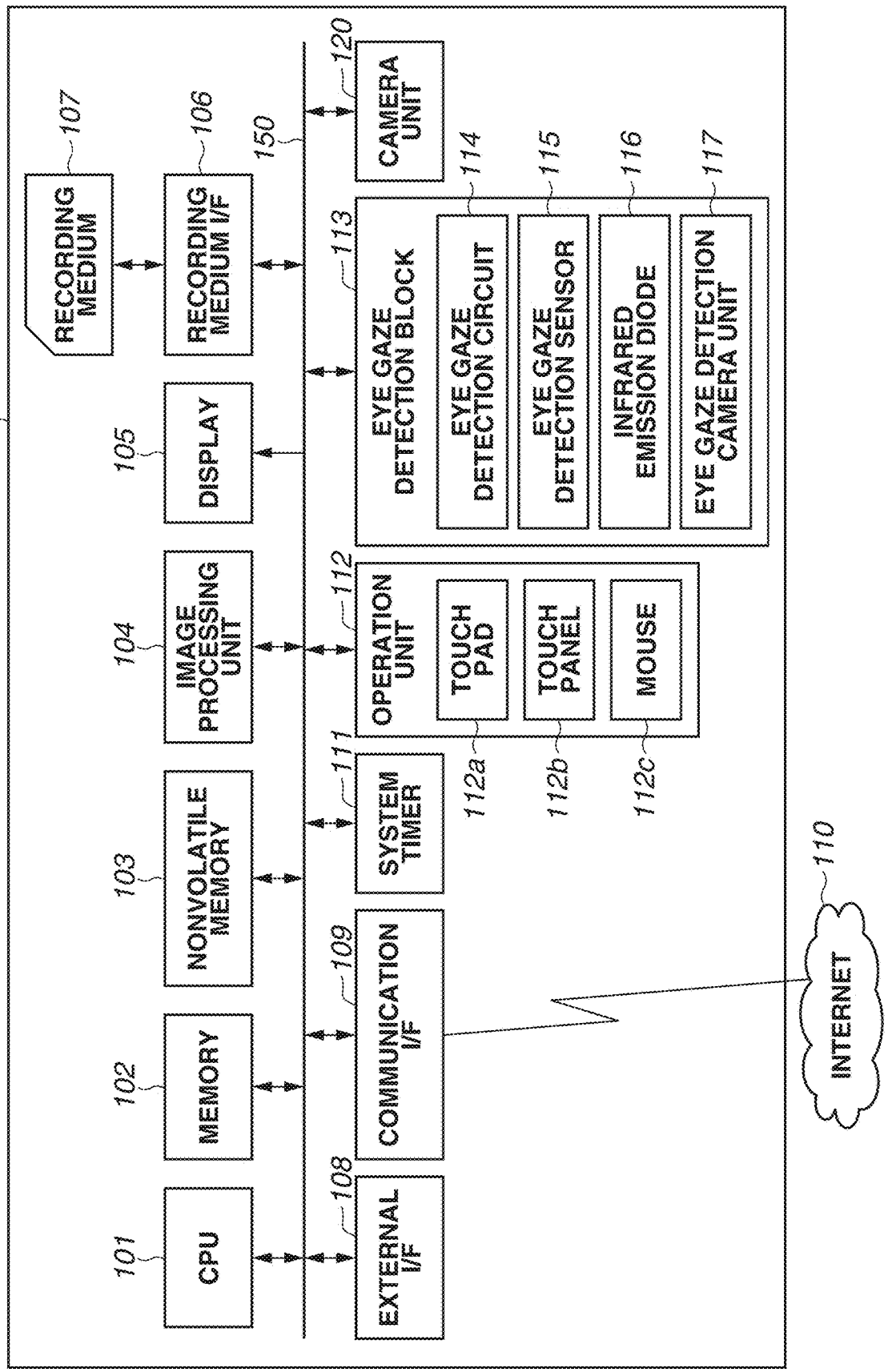
FIG. 2 is a block diagram illustrating a configuration of the personal computer.

FIG. 1 illustrates an outer appearance of a personal computer (PC) 100 as an example of an apparatus (electronic apparatus) to which the present invention is applicable. FIG. 1 illustrates a laptop PC in an opened state. FIG. 2 is a block diagram illustrating an example of a configuration of the PC 100 according to the present exemplary embodiment.

A central processing unit (CPU) 101, a memory 102, a nonvolatile memory 103, an image processing unit 104, a display 105, and a recording medium interface (I/F) 106 are connected to an internal bus 150. Further, similarly, an external I/F 108, a communication I/F 109, a system timer 111, an operation unit 112, an eye gaze detection block 113, and a camera unit 120 are connected to the internal bus 150. Each of the units connected to the internal bus 150 is configured to be able to exchange data between each other via the internal bus 150.

The CPU 101 is a control unit that controls the entire PC 100, and includes at least one processor or circuit. The memory 102 includes, for example, a random access memory (RAM) (a volatile memory using a semiconductor element). The CPU 101 controls each of the units of the PC 100 using the memory 102 as a work memory based on a program stored in, for example, the nonvolatile memory 103. The nonvolatile memory 103 stores therein image data, audio data, other data, and various kinds of programs used by the CPU 101 to operate. The nonvolatile memory 103 includes, for example, a flash memory, a read only memory (ROM), and/or a hard disk (HD).

The image processing unit 104 performs various kinds of image processing on the image data stored in the nonvolatile memory 103 or a recording medium 107, a video signal acquired via the external I/F 108, and image data acquired via the communication I/F 109 based on the control by the CPU 101. The image processing performed by the image processing unit 104 includes analog-to-digital (A/D) conversion processing, digital-to-analog (D/A) conversion processing, processing for coding image data, compression processing, decoding processing, enlargement/reduction processing (resizing), noise reduction processing, and color conversion processing. The image processing unit 104 may include a dedicated circuit block for performing specific image processing. Alternatively, the CPU 101 can also perform the image processing based on a program without using the image processing unit 104 depending on the type of the image processing.

The display 105 displays, for example, an image and a graphical user interface (GUI) screen forming a GUI based on the control by the CPU 101. The CPU 101 generates a display control signal based on the program, thereby controlling each of the units of the PC 100 so as to generate a video signal for displaying a video image on the display 105 and output the video signal to the display 105. The display 105 displays the video image based on the output video signal. The display 105 is a display unit that is provided to the PC 100 and that displays various kinds of information. Alternatively, the PC 100 may be configured to include only as far as an interface for outputting the video signal for displaying the video image on the display 105 and may use an external monitor (a television or the like) as the display 105.

The recording medium I/F 106 is configured in such a manner that the recording medium 107, such as a memory card, a compact disk (CD), and a digital versatile disk (DVD) can be attached thereto. The recording medium I/F 106 reads data from the attached recording medium 107 and writes data into the recording medium 107 based on the control by the CPU 101.

The external I/F 108 is an interface for connecting with an external apparatus via a wired cable or wirelessly and inputting/outputting the video signal and an audio signal.

The communication I/F 109 is an interface for communicating with an external apparatus and the Internet 110 and transmitting/receiving various kinds of data such as a file and a command.

The system timer 111 is a time measurement unit that measures a time for use in various kinds of control and a time of a built-in clock.

The operation unit 112 includes an input device for receiving a user operation including a character information input device such as a keyboard, a touch pad 112*a*, a touch panel 112*b*, and/or a mouse 112*c*. Not being limited thereto, the operation unit 112 also includes a three-dimensional space pointing device that determines an operation amount based on rotational amounts of a tilt and a roll in a three-dimensional space, a button, a dial, a joystick, and the like. The touch panel 112*b* is an operation member on which a touch operation can be performed, and can detect a touch operation onto a display surface (operation surface) of the display 105. The touch panel 112*b* and the display 105 can be configured integrally with each other. The mouse 112*c* includes a click portion on which a pressing operation can be performed at the surface portion thereof, and a portion on which an index finger is placed and a portion on which a middle finger is placed when the mouse 112*c* is held with a right hand will be referred to as a left click portion and a right click portion, respectively. By performing a click operation on the click portion, a user can, for example, select a file to be displayed on the display 105 and select a range by moving the mouse 112*c* while continuing the click operation. The operation unit 112 may be embodied by an external device. The operation unit 112 also receives a user operation that serves as a trigger to move a pointer displayed on the display 105 to an eye gaze input position, which will be described below.

The CPU 101 can detect the following operations on the touch pad 112*a* or states of the touch pad 112*a*.

A finger that has not been touching the touch pad 112*a* now touches the touch pad 112*a*. In other words, a touch is started (hereinafter referred to as a Touch-Down).

The finger is in a state of touching the touch pad 112*a* (hereinafter referred to as a Touch-On).

The finger is moved while keeping the touch on the touch pad 112*a* (hereinafter referred to as a Touch-Move).

The finger that has been touching the touch pad 112*a* is released from the touch pad 112*a*. In other words, the touch is ended (hereinafter referred to as a Touch-Up).

The touch pad 112*a* is in a state of being touched by nothing (hereinafter referred to as a Touch-Off).

When the Touch-Down is detected, the Touch-On is also detected at the same time. After the Touch-Down, detection of the Touch-On normally continues as long as the Touch-Up is not detected. The Touch-Move is detected in a state where the Touch-On is also detected. Even when the Touch-On is detected, the Touch-Move is not detected unless a touched position is being moved. After detection of the Touch-Up of all the fingers that have been in touch with the touch pad 112*a*, the touch pad 112*a* transitions to the Touch-Off.

The CPU 101 is notified of the operations/states and the positional coordinate at which the finger touches the touch pad 112*a* via the internal bus 150, and determines what kind of operation has been performed on the touch pad 112*a* based on such information that the CPU 101 is notified of. Regarding the Touch-Move, the CPU 101 can also determine a movement direction of the finger moving on the touch pad 112*a* based on a change in the positional coordinate for each of a vertical component and a horizontal component on the touch pad 112*a*. Further, it is defined that a stroke is drawn when the Touch-Up is performed after the Touch-Move is performed in a predetermined manner from the Touch-Down on the touch pad 112*a*. An operation of quickly drawing the stroke will be referred to as a flick. The flick is an operation of quickly moving the finger only a certain distance while keeping the finger in touch with the touch pad 112*a*, and then releasing the finger from the touch pad 112*a*. In other words, the flick is an operation of rapidly sliding the finger on the touch pad 112*a* as if flicking the touch pad 112*a* with the finger. The CPU 101 can determine that the flick is performed when detecting that the Touch-Move is performed across a predetermined distance or longer at a predetermined speed or higher and then detecting the Touch-Up. The CPU 101 determines that a drag is performed when detecting that the Touch-Move is performed across a predetermined distance or longer at a lower speed than a predetermined speed. A touch operation of touching a plurality of points (for example, two points) at the same time and moving the respective touched positions close to each other will be referred to as a pinch-in. A touch operation of moving the respective touched positions away from each other will be referred to as a pinch-out. The pinch-out and the pinch-in will be collectively referred to as a pinch operation (or simply a pinch). The touch pad 112*a* may be embodied by employing any touch pad among touch pads working based on various methods, such as the resistive film method, the electrostatic capacitance method, the surface acoustic wave method, the infrared method, the electromagnetic induction method, the image recognition method, and the optical sensor method. Possible types of the touch pad include a type that detects the touch when the touch pad 112*a* is touched, and a type that detects the touch when a finger approaches the touch pad 112a, depending the employed method. The touch pad 112a may be embodied by employing any type of them.

An infrared emission diode 116 is a light emission element for detecting the user's eye gaze input position, and irradiates the user's eyeball (eye) with infrared light. The infrared light emitted from the infrared emission diode 116 is reflected on the eyeball (eye), and the reflected infrared light is imaged on an imaging plane of an eye gaze detection sensor 115. The eye gaze detection sensor 115 includes an imaging device such as a charge coupled device (CCD) image sensor. The eye gaze detection sensor 115 photoelectrically converts the incident reflected infrared light into an electric signal and outputs the signal to an eye gaze detection circuit 114. The eye gaze detection circuit 114 includes at least one processor, and detects the user's eye gaze input position from an image or movement of the user's eyeball (eye) based on the signal output from the eye gaze detection sensor 115 and outputs detection information to the CPU 101. In this manner, the eye gaze detection block 113 is constituted of the eye gaze detection circuit 114, the eye gaze detection sensor 115, the infrared emission diode 116, and an eye gaze detection camera unit 117. The eye gaze detection block 113 is one of examples of a reception unit that receives an eye gaze input.

In the present exemplary embodiment, an eye gaze is detected by a method called the corneal reflection technique using the eye gaze detection block 113. The corneal reflection technique is a method that detects the direction and the position of an eye gaze based on a positional relationship between the infrared light, which is emitted from the infrared emission diode 116 and reflected on the eyeball (eye), in particular, the corneal, and the pupil of the eyeball (eye). In addition, there are various other methods for detecting the direction and the position of an eye gaze, such as a method called the sclera reflection technique that utilizes a fact that a light reflectance is different between the iris and the sclera. An eye gaze detection method other than the above-described examples may be used as long as it is a method capable of detecting the direction and the position of an eye gaze. The eye gaze detection block 113 does not have to include the above-described infrared emission diode 116, and may detect the eye gaze input position by imaging the eyeball (eye) using the camera unit 120, which will be described below.

The PC 100 has been described as being configured to include the eye gaze detection block 113 in the present exemplary embodiment, but the eye gaze detection block 113 may be embodied by an external eye gaze detector. In other words, the present exemplary embodiment can also be implemented even when being configured to detect the user's eye gaze input position by connecting the external eye gaze detector to the PC 100.

The CPU 101 can detect the following operations or states based on an output from the eye gaze detection block 113.

The PC 100 is in a state in which the user inputs the eye gaze.

The PC 100 is in a state in which the user focuses his/her gaze on a position.

The user removes his/her gaze that has been input. In other words, the input of the eye gaze is ended.

The PC 100 is in a state in which the user inputs no eye gaze.

Focusing the gaze on the position described herein refers to a state in which the user's eye gaze input position does not exceed a predetermined movement amount within a predetermined time.

The camera unit 120 is a camera disposed on the same surface side as the display 105 of the PC 100. An image captured by the camera unit 120 can be displayed on the display 105. As described above, the user's eye gaze input position can be detected by using the camera unit 120 mounted on the PC 100 without use of the dedicated eye gaze detection camera 117 included in the eye gaze detection block 113. In such a case, the eye gaze input position is detected based on the direction of the user's face or the direction of the eyeball (eye) from the image captured by the camera unit 120 instead of the corneal reflection technique working in the above-described manner.

For the Touch-Move operation performed on the touch panel 112b among the operations performed on the operation unit 112, the method for specifying the position of the positional coordinate corresponding to the Touch-Move operation can be set to either a method that specifies an absolute position or a method that specifies a relative position. For example, when the positional coordinate corresponds to the pointer displayed on the display 105, in the case of the method that specifies the absolute position, a pointer associated with a touched position (coordinate input position) is set when the touch panel 112b is touched. In other words, the positional coordinate at which the touch operation is performed and the positional coordinate on the display 105 are associated with each other. On the other hand, in the case of the method that specifies the relative position, the positional coordinate at which the touch operation is performed and the positional coordinate on the display 105 are not associated with each other. In the method that specifies the relative position, the touch position is moved from the currently displayed pointer position in the movement direction of the Touch-Move a distance corresponding to the movement amount of the Touch-Move irrespective of the Touch-Down position on the touch panel 112b. On the other hand, only the method that specifies the relative position is employed in an operation performed on the touch pad 112a, the mouse 112c, and another pointing device, which are the input devices other than the touch panel 112b.

In the present exemplary embodiment, if a predetermined operation is performed on the operation unit 112 in a state where the user's eye gaze input is present, the pointer displayed on the display 105 is moved to the eye gaze input position.

FIGS. 3A to 3D illustrate display examples regarding movements of the pointer on the display 105 based on the user's eye gaze input and operations on the external mouse 112c.

Figure 3A:
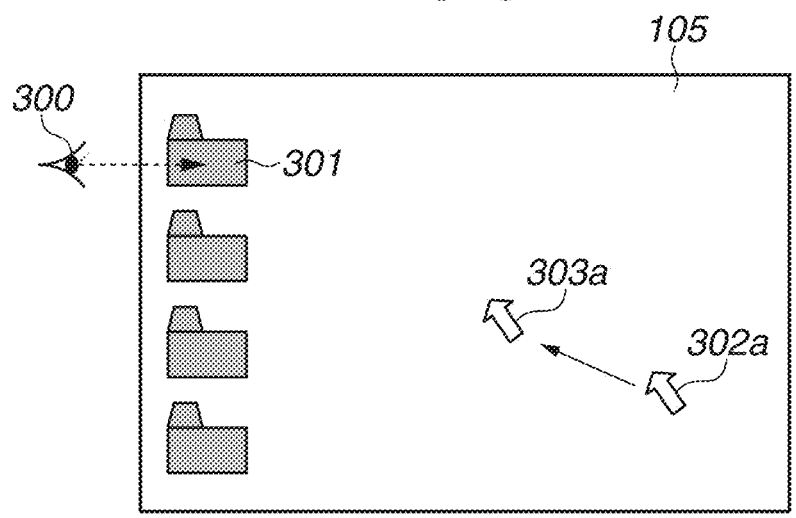
FIGS. 3A, 3B, 3C, and 3D illustrate display examples regarding movements of a pointer on a display in response to a user's eye gaze input and an operation on a mouse.
Figure 3B:
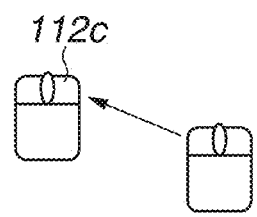

FIGS. 3A and 3B illustrate an example of the display 105 and the movement of the mouse 112c when the eye gaze is input by the user. A case is cited where the eye gaze is input by the user, i.e., the eye gaze detection block 113 can detect the user's eye gaze. When the mouse 112c is operated as illustrated in FIG. 3B in the state where the eye gaze input is present, the pointer (arrow) displayed on the display 105 is moved from a position 302a (the position of the pointer before the operation) to a position 303a by an amount corresponding to an operation amount of the mouse 112c. A movement amount of the pointer moved corresponding to the operation amount of the mouse 112c can be set arbitrarily by the user. For example, the pointer is moved by a movement amount proportional to the operation amount of the mouse 112c. When an operation of shaking the mouse 112c from side to side, which will be described below with reference to FIGS. 3C and 3D, is performed in the state illustrated in FIGS. 3A and 3B in which the pointer is moved corresponding to the operation amount on the mouse 112c, the pointer displayed on the display 105 is moved to the eye gaze input position.

Figure 3C:
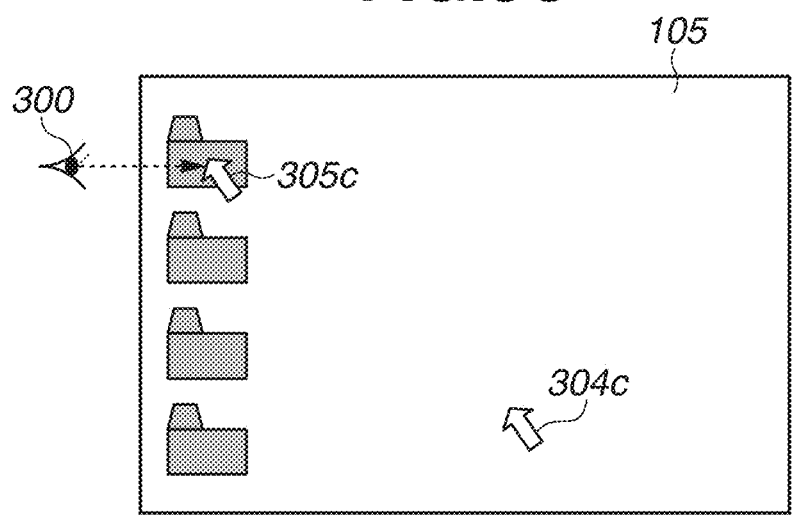
Figure 3D:
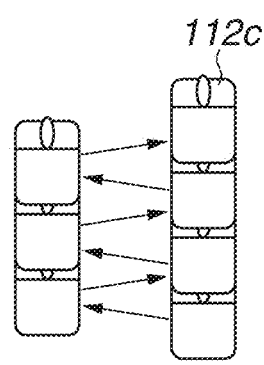

FIGS. 3C and 3D illustrate an example of the display 105 and the movement of the mouse 112c when the eye gaze is input by the user. When the operation of shaking the mouse 112c from side to side is performed as illustrated in FIG. 3D in this state, the pointer displayed at a position 304c (the position of the pointer before the operation) on the display 105 illustrated in FIG. 3C is moved to a position 305c, which is the eye gaze input position at which a user's eye 300 is looking. As a result, the user can move the pointer from the position 304c to the position 305c with a small operation amount.

FIGS. 4A, 4B, 4C, 4D, 4E, and 4F illustrate display examples regarding movements of the pointer on the display 105 corresponding to operations after the pointer is moved to the user's eye gaze input position described with reference to FIGS. 3A, 3B, 3C, and 3D.

Figure 4A:
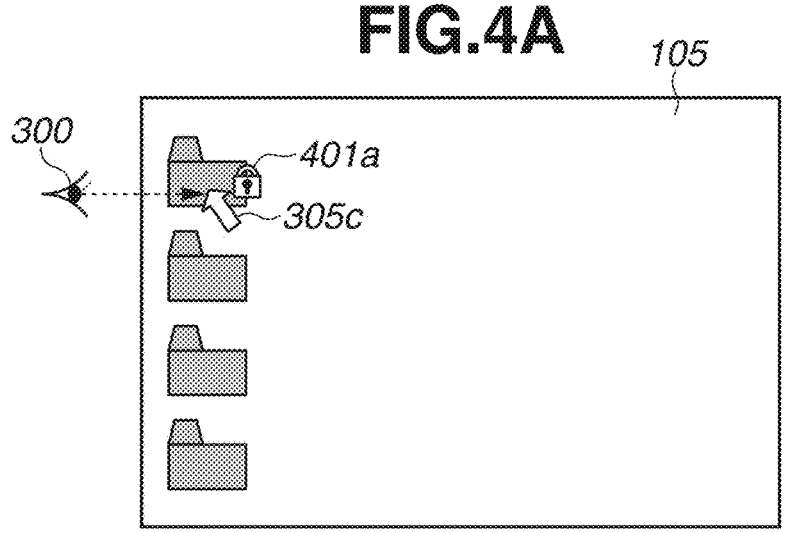
FIGS. 4A, 4B, 4C, 4D, 4E, and 4F illustrate display examples regarding movements of the pointer on the display in response to an operation on the mouse after the pointer is moved to a user's eye gaze input position.
Figure 4B:
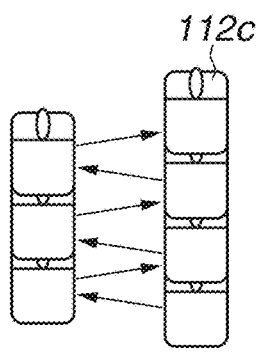

FIGS. 4A and 4B illustrate an example in which the operation of shaking the mouse 112c from side to side described above with reference to FIGS. 3C and 3D is performed, the pointer displayed on the display 105 is moved to the eye gaze input position, and then the operation of shaking the mouse 112c from side to side is continuously performed. If the operation performed on the mouse 112c is not ended and the operation of shaking the mouse 112c from side to side is continuously operated (FIG. 4B) after the pointer is moved to the eye gaze input position in FIGS. 3C and 3D, the pointer displayed on the display 105 is fixed at the position 305c, which is the position of the eye 300. In other words, the pointer is not moved from side to side even if the operation of shaking the mouse 112c from side to side is performed after the pointer is moved to the position 305c, which is the eye gaze input position. Further, an icon 401a is displayed to notify the user that the pointer is fixed after the pointer is moved to the position 305c. In FIG. 4A, the PC 100 notifies the user that the pointer cannot be moved (is fixed) by displaying an icon illustrating a padlock that is locked. However, display at this time is not limited to the icon as illustrated in FIG. 4A as long as the display can make the user aware that the pointer is fixed or unfixed. For example, the color and/or shape of the pointer may be changed only while the pointer is fixed. If an operation is performed on the mouse 112c in the fixed state, the pointer may be displayed so as to jiggle at the position where the pointer is fixed.

Figure 4C:
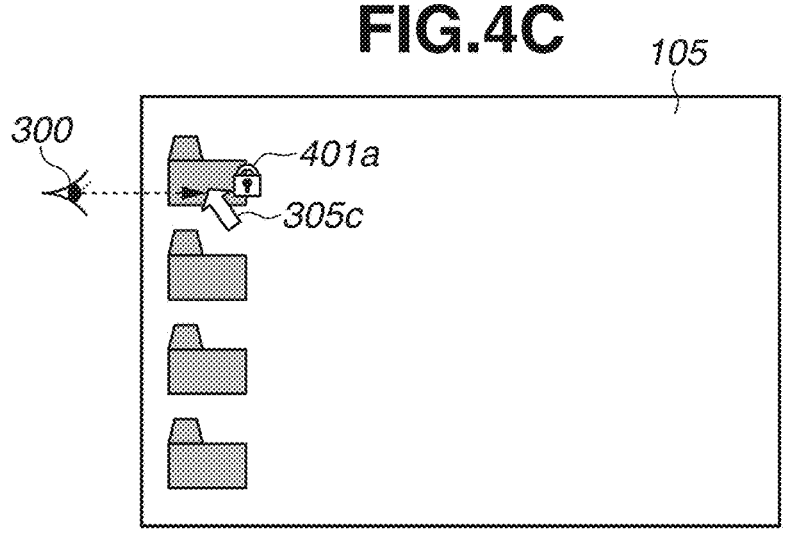
Figure 4D:
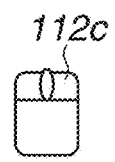

FIGS. 4C and 4D illustrate how the pointer is displayed on the display 105 when an operation of stopping the mouse 112c is performed after the pointer is moved to the position 305c, which is the eye gaze input position, by the operation of shaking the mouse 112c from side to side in FIGS. 3C and 3D. In a case where the operation is changed from the operation of shaking the mouse 112c from side to side illustrated in FIG. 4B to an operation of holding the mouse 112c still illustrated in FIG. 4D, it can be assumed that the user has intentionally held the mouse 112c still. The user may have stopped the operation on the mouse 112c because the user is considering unfixing the fixed pointer to proceed to the next operation after moving the pointer to the eye gaze input position. An example of unfixing the pointer that has been moved to the eye gaze input position at which the user's eye 300 is looking with the operation of stopping the mouse 112c has been described. However, the operation for unfixing the pointer is not limited to the stop operation as will be described below in step S512 in a flowchart illustrated in FIG. 5. The pointer may be controlled in the above-described manner when the movement amount per unit time is smaller than a predetermined value.

Figure 4E:
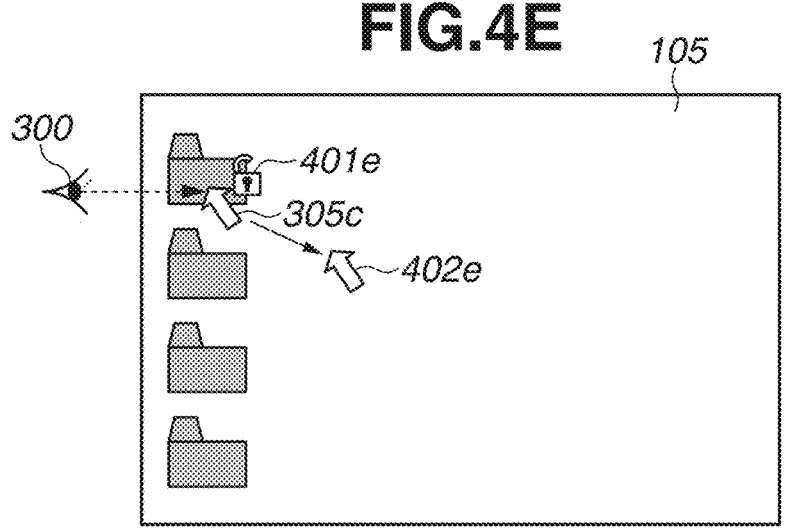
Figure 4F:
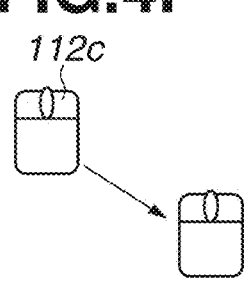

FIGS. 4E and 4F illustrate that holding the mouse 112c still in FIGS. 4C and 4D causes the pointer displayed on the display 105 to be unfixed, thereby allowing the user to perform an operation. The pointer is fixed (FIG. 4A) after being moved to the position 305c, which is the eye gaze input position at which the user's eye 300 is looking, in FIGS. 3C and 3D, and the pointer is unfixed in response to the mouse 112c being held still (FIG. 4D). More specifically, as illustrated in FIG. 4E, the icon is changed from the icon 401a indicating that the pointer is fixed to an icon 401e indicating that the pointer is unfixed. The icon 401e is drawn as a picture of a padlock in an unlocked state. In the present exemplary embodiment, the icon 401e indicating that the pointer is unfixed, which is different from the icon 401a, is displayed when the pointer is unfixed. Alternatively, the icon 401a may simply be hidden. In other words, when the pointer is unfixed, a display mode of the pointer that has been changed while the pointer is fixed may be returned to a display mode of the pointer when the pointer is not fixed (at normal times). As described above with reference to FIGS. 4C and 4D, the user may have stopped the operation on the mouse 112c because the user is considering unfixing the fixed pointer to proceed to the next operation. Thus, the PC 100 unfixes the pointer, thereby allowing the user to proceed to the next operation in response to the temporarily stop of the operation on the mouse 112c. When the mouse 112c is operated as illustrated in FIG. 4F, the pointer is moved from the position 305c to a position 402e illustrated in FIG. 4E by an amount corresponding to the operation amount on the mouse 112c since the pointer is already unfixed. If the user performs the operation of shaking the mouse 112c from side to side as illustrated in FIG. 4B again at the position 402e after moving the pointer to the position 402e illustrated in FIG. 4E, the pointer is moved to the position 305c, which is the user's eye gaze input position.

Figure 6:
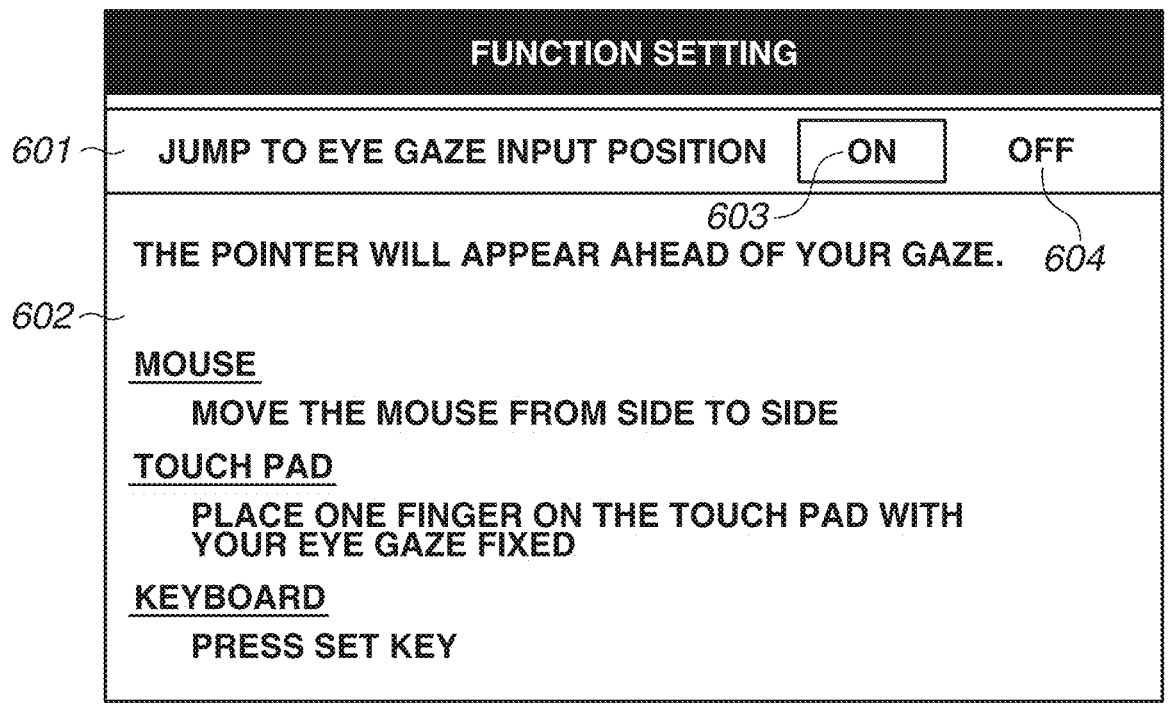
FIG. 6 illustrates a display example of a function setting screen.

FIG. 5 is a flowchart of control processing for controlling the pointer displayed on the display 105 of the PC 100 by driving the PC 100, the operation unit such as the mouse 112c, and the eye gaze detector and by using the user's eye gaze input and the mouse operation. The control processing is implemented by the CPU 101 executing the program stored in the nonvolatile memory 103 on the PC 100. The flowchart illustrated in FIG. 5 is started when the PC 100 is started up, the eye gaze detector is started up, and the eye gaze detection is enabled. The flowchart will be described referring to an example in which the PC 100 has a function of a jump to the eye gaze input position as one of functions of the eye gaze detector. A setting screen illustrated in FIG. 6 indicates a functional description in an item 601, i.e., the jump to the eye gaze input position, and an example of an operation performed on each operation member for causing the pointer to jump to the eye gaze input position in a region 602. Selecting one of a candidate 603 and a candidate 604, which are setting candidates, can switch on and off of the function of the jump to the eye gaze input position. In FIG. 6, it can be seen that the function of the jump to the eye gaze input position is set to on due to selection of the candidate 603.

In step S501, the CPU 101 determines whether the function of causing the pointer to jump to the eye gaze input position is set to ON. If the function is set to ON (YES in step S501), the processing proceeds to step S502. If not (NO in step S501), the present control flowchart is ended.

In step S502, the CPU 101 determines whether a mouse operation is performed. If the mouse operation is performed (YES in step S502), the processing proceeds to step S503. If not (NO in step S502), the processing proceeds to step S514.

In step S503, the CPU 101 determines whether the user's eye gaze is detected. If the user's eye gaze is detected (YES in step S503), the processing proceeds to step S504. If not (NO in step S503), the processing proceeds to step S506.

In step S504, the CPU 101 determines whether the mouse operation is a predetermined operation serving as a condition for causing the pointer to jump to the eye gaze input position. If the mouse operation is the predetermined operation (YES in step S504), the processing proceeds to step S505. If not (NO in step S504), the processing proceeds to step S506. The predetermined operation is an operation such as the following operations.

An operation of shaking the mouse 112c from side to side several times (an operation in which a reciprocating operation of moving the mouse 112c rightward or leftward a predetermined distance or longer and then moving it in the opposite direction a predetermined distance or longer is repeated a predetermined number of times (for example, three times) or more).

An operation of moving the mouse 112c in a direction toward the eye gaze input position (an operation of moving the mouse 112c from the pointer position before the operation in the direction toward the eye gaze input position a predetermined distance or longer).

A movement operation with a click operation or a Touch-Down being continued (an operation of moving the mouse 112c or the finger while continuing a click operation on the mouse 112c or a Touch-Down on the touch pad 112a for a predetermined time or longer).

The above-described operation of shaking the mouse 112c from side to side several times may be any reciprocating operation of switching the operation direction a predetermined number of times or more, and thus the operation direction may be not only the horizontal direction but also a direction toward the upper left (lower left) or a direction toward the upper right (lower right) or the vertical direction.

In the present exemplary embodiment, the case has been described where the pointer is caused to jump to the eye gaze input position using the operation of shaking the mouse 112c from side to side several times relative to the PC 100. However, the operation is not limited to such operation as long as it is an operation that can be determined as an intentional operation by the user. More specifically, the touch pad 112a provided to the PC 100 may be used, or a pointing device may be used in performing the above-described operation to implement the present exemplary embodiment. In addition to the above-described predetermined operations, the following predetermined operation may also be used on the touchpad 112a.

An operation of continuing a Touch-Down (an operation of performing a Touch-Down on the touch pad 112a and continuing the Touch-Down for a predetermined time or longer at the Touch-Down position without performing a Touch-Move).

The following predetermined operations may also be used on the touch panel 112b and an arrow key (cross key) that can be operated in four directions.

A Touch-Move operation (a Touch-Move operation performed across a predetermined distance or longer in the direction toward the eye gaze input position in a case where the method for specifying the position on the touch panel 112b is the method that specifies the relative position).

An operation of holding down the arrow key (an operation of holding down any one of arrow keys among the left, right, up, and down arrow keys of the cross key for a predetermined time or longer).

All of the above-described operations correspond to an operation performed on an operation member by a predetermined amount or more. The pointer is prevented from being caused to jump to the eye gaze input position unless the operation is performed by the predetermined amount or more to reliably determine that the user has an intention of causing the pointer to jump, not an intention to issue an operation instruction different from the jump to the eye gaze input position. If the pointer is caused to jump even with an operation performed by an amount smaller than the predetermined amount, the following inconvenience would be caused. For example, jumping the pointer to the eye gaze input position with a click operation on the mouse 112c would cause the pointer to be moved to the eye gaze input position despite the fact that the user is considering just selecting an item at the pointer position, thereby making the user confused or feel that usability is unsatisfactory.

In step S505, the CPU 101 moves the pointer to the eye gaze input position. The CPU 101 moves the pointer (causes the pointer to jump) to the eye gaze input position at which the user's eye 300 is looking since the predetermined operation has been detected in step S504. In the present exemplary embodiment, a configuration has been described in which the pointer is instantaneously moved (caused to jump) from the position at which the pointer is displayed (position before the movement) to the eye gaze input position as the method for moving the pointer to the eye gaze input position, but the method for moving the pointer to the eye gaze input position is not limited thereto. Regarding a destination to which the pointer is moved, the pointer position may be gradually moved to the eye gaze input position while being expressed in an animation after being instantaneously moved to a position slightly short of the eye gaze input position in consideration of the relative position between the pointer position at which the pointer is originally displayed and the eye gaze input position. Displaying the pointer in this manner allows the user to easily understand that the pointer is instantaneously moved to the eye gaze input position. As a result, the mouse pointer appears at the position of the eye gaze of the user, and thus the user-friendliness for the user can be improved for cases where, for example, the user loses track of the mouse pointer or the mouse pointer is currently located at a position far away from the position to which the user wants to move the mouse pointer.

In step S506, the CPU 101 moves the relative position of the pointer by an amount corresponding to the operation amount on the mouse 112c. The CPU 101 moves the relative position of the pointer by the amount corresponding to the operation amount on the mouse 112c as illustrated in FIGS. 3A and 4E in response to the operation on the mouse 112c as illustrated in FIGS. 3B and 4F.

In step S507, the CPU 101 locks the movement of the pointer displayed on the display 105. The CPU 101 fixes the pointer moved to the eye gaze input position in step S506, thereby preventing the pointer from being moved even if a mouse operation is performed. Such fixation can reduce the possibility that the pointer that has been moved to the eye gaze input position is further moved from the eye gaze input position due to a mouse operation and the user loses tack of the pointer. Further, the icon 401a illustrated in FIG. 4A is displayed near the pointer to make the user aware of fixation of the pointer.

In step S508, the CPU 101 resets and starts the timer included in the system timer 111 to perform a determination about the condition for unfixing the pointer. Further, the CPU 101 initializes a variable for storing the operation amount on the mouse 112*c*, and stores it in the memory 102.

In step S509, the CPU 101 determines whether an operation is performed on the mouse 112*c*. If the operation is performed on the mouse 112*c* (YES in step S509), the processing proceeds to step S510. If not (NO in step S509), the processing proceeds to step S511.

In step S510, the CPU 101 records the operation amount on the mouse 112*c* in step S509 by adding it to the variable for storing the operation amount on the mouse 112*c* that is stored in the memory 102.

In step S511, the CPU 101 determines whether the timer started in step S508 has reached expiration. If the timer has reached the expiration (YES in step S511), the processing proceeds to step S512. If the timer has not reached the expiration (NO in step S511), the processing returns to step S509. The timer used herein is specifically set for 0.25 seconds or so.

In step S512, the CPU 101 determines whether the operation amount on the mouse 112*c* stored by being added to the variable in step S510 is smaller than or equal to a predetermined value. In other words, the CPU 101 determines whether the operation amount per unit time, i.e., the operation amount per 0.25 seconds, in the present exemplary embodiment is smaller than or equal to the predetermined value. If the operation amount is smaller than or equal to the predetermined value (YES in step S512), the processing proceeds to step S513. If not (NO in step S512), the processing returns to step S508. In other words, the CPU 101 determines whether the continued operation on the operation member is ended. In the case of the mouse 112*c* in the present exemplary embodiment, the CPU 101 determines whether the mouse 112*c* is temporarily held still. It is highly possible that the user visually recognizes that the pointer has moved to the eye gaze input position and intends to proceed to the next operation when the mouse 112*c* is temporarily held still. The pointer may be unfixed in the following cases in addition to or instead of the determination about whether the mouse 112*c* is temporarily held still, which has been described in steps S508 to S512.

The end of the click operation using the mouse 112*c* or the touch pad 112*a*.

The end of the Touch-Down with no Touch-Move performed on the touch pad 112*a* (Touch-Up).

A Touch-Up from the touch panel 112*b*.

The end of the operation of holding down the arrow key of the cross key.

The predetermined value of the operation amount determined in step S512 can be set to a small value infinitely close to zero if the operation member is a device such as the mouse 112*c* and the cross key, i.e., the device that can be explicitly determined if an operation is performed on the device. In other words, displacement amounts in both an x direction and a y direction may be set to zero (no operation performed). On the other hand, the above-described predetermined value may be set to a certain large value instead of zero if the operation member is a device that slightly moves even if the user intends not to operate it, such as the three-dimensional space pointing device. In other words, the predetermined value may be set based on the characteristic of the device that the user operates, or may be provided so as to allow the user to arbitrarily set it. In any case, the predetermined value is a value that leads to an assumption that the user intentionally stops (closes) the operation for now.

In step S513, the CPU 101 unfixes the pointer displayed on the display 105 that has been fixed in step S507. The icon 401*a* indicating that the pointer is fixed, which has been displayed in step S507, is changed to the icon 401*e* illustrated in FIG. 4E indicating that the pointer is unfixed.

In step S514, the CPU 101 determines whether the processing is ended. If the processing is ended (YES in step S514), the present control flowchart is ended. If not (NO in step S514), the processing returns to step S501. The end of the processing means a power-off of the PC 100 or the display 105, and detachment of the eye gaze detection block 113 in the case where the eye gaze detection block 113 is externally attached. The pointer is unfixed after being caused to jump to the eye gaze input position. Then, after the processing returns from step S514 to step S501, if the mouse 112*c* is operated, the CPU 101 moves the pointer displayed on the display 105 by an amount corresponding to the operation amount on the mouse 112*c* as illustrated in FIG. 4E. At this time, the CPU 101 moves the pointer by the amount corresponding to the operation amount only without causing the pointer to jump to the eye gaze input position even if the predetermined operation as described in step S504 is performed.

The pointer displayed on the display 105, which has been described with reference to FIG. 3A to FIG. 5, is an indicator that can select a display item such as a file and a folder also displayed on the display 105. Moving the indicator and selecting, for example, a folder (with a click operation, a double-click operation, or the like) causes, for example, a cursor to be displayed on the file to indicate that the file is selected or causes a list of data in the folder to be displayed (i.e., causes the screen to transition to a screen or a page at a hierarchical layer one layer below the selected folder). Clicking an icon triggers processing for executing a program corresponding to the icon. Further, clicking an icon not only selects the clicked display item, but also triggers predetermined processing based on the clicked position by the click operation. For example, when a live view image captured by the image sensor is displayed on the display 105, it is possible to specify an automatic focus (AF) position (a position at which an AF frame is displayed) for conducting AF detection, and perform AF processing. An operation of moving the mouse 112*c* while clicking the mouse 112*c* causes the PC 100 to specify a position used as a basis for determining a range in which the processing is performed on the image to display on the display 105, and perform the image processing (trimming, enlargement/reduction, and the like).

In FIGS. 3A and 3B, in a case where the user's eye gaze is not input, the pointer displayed on the display 105 is moved by the amount corresponding to the operation performed on the mouse 112*c*. In FIGS. 3C and 3D, if the predetermined operation is performed on the mouse 112*c* in a case where the user's eye gaze is input, the pointer displayed on the display 105 is moved to the eye gaze input position. As a result, the pointer is moved to the position at which the user is looking, and thus the pointer can be moved to the desired position with a small operation amount.

In FIGS. 4A and 4B, in a case where the user continues to perform the predetermined operation on the mouse 112*c* after moving the pointer to the eye gaze input position in FIGS. 3C and 3D, the pointer moved to the eye gaze input position is fixed. The fixation can prevent the pointer from being further moved to another position due to an operation on the mouse 112*c* without the user visually recognizing the pointer that has been moved to the eye gaze input position. In other words, the present configuration can reduce an erroneous operation from being performed on the pointer that has been moved to the eye gaze input position.

In FIGS. 4C and 4D, the pointer that has been moved to the eye gaze input position is not unfixed until an operation intentionally performed by the user, such as holding the mouse 112c still, can be detected. The operation such as holding the mouse 112c still is highly likely to be performed intentionally by the user. In other words, the pointer that has moved to the eye gaze input position is not unfixed until the operation that can be assumed as being intentionally performed by the user is detected. Controlling the pointer in this manner allows the pointer to be kept fixed while the user does not locate the pointer that has been moved to the eye gaze input position. Thus, a movement of the pointer not intended by the user can be reduced. If the pointer is unintentionally unfixed due to, for example, the elapse of a predetermined time, the pointer may be unfixed before the user locates the pointer that has been moved to the eye gaze input position, and this may impair the usability. The user can unfix the pointer quickly at a desired timing by performing the user's operation (for example, holding the mouse 112c still) at the moment when the user visually recognizes the pointer.

In FIGS. 4E and 4F, since the user holds the mouse 112c still in FIGS. 4C and 4D, the pointer that has been moved to the eye gaze input position is unfixed, and the pointer displayed on the display 105 is moved by the amount corresponding to the operation amount on the mouse 112c.

Due to these control procedures, the user can instantaneously move the pointer to the eye gaze input position by performing the predetermined operation on the pointer even when the currently displayed pointer and the desired position are located away from each other. Further, the pointer is fixed until the user locates (visually recognizes) the pointer that has been moved to the eye gaze input position to prevent the pointer from being moved against the user's intention. As a result, the user can move the pointer to the eye gaze input position and can also reduce an erroneous operation without losing track of the pointer that has been moved. Further, the pointer can be unfixed by the operation that can be assumed as the user's intentional operation, so that the user can unfix the pointer at his/her desired timing without waiting for a predetermined time to elapse and proceed to the next operation quickly.

Regarding each of the above-described various kinds of control described as being performed by the CPU 101, a single hardware component may perform the control, or a plurality of hardware components (for example, a plurality of processors or circuits) may share processing of the control to control the entire apparatus.

The present invention has been described in detail based on the representative exemplary embodiment thereof, but the present invention is not limited to the above-described specific exemplary embodiment and also covers various exemplary embodiments within the scope that does not depart from the spirit of the present invention. Further, the above-described exemplary embodiment merely represents one exemplary embodiment of the present invention, and the various exemplary embodiments can be combined as appropriate.

The above-described exemplary embodiment has been described based on the example in which the present invention is applied to the personal computer, but the applicability of the present invention is not limited to the example, and the present invention can be applied to any electronic apparatus having the function capable of detecting an eye gaze input. More specifically, the present invention can also be applied to an imaging apparatus such as a digital camera having the function capable of detecting an eye gaze input. An indicator such as a cursor displayed on, for example, a back-side liquid crystal display provided to the digital camera is caused to jump to the eye gaze input position by an operation performed on a cross key, and the fixation/unfixation of the indicator can be controlled based on continuation/end of the operation performed on the cross key. Further, the present invention can also be applied to the following apparatuses as long as they have the function capable of detecting an eye gaze input: a personal digital assistant (PDA), a mobile phone terminal, a mobile image viewer, a printer apparatus including a display, a digital photo frame, a music player, a game machine, and an electronic book reader.

The present invention can also be realized by performing the following processing. Specifically, the present invention can be realized through the processing of supplying software (a program) to implement the functions of the above-described exemplary embodiments to a system or an apparatus via a network or various kinds of recording media, and causes a computer (or a CPU, a micro processing unit (MPU), or the like) of the system or apparatus to read and execute the program code. In this case, the program and the recording medium storing the program will constitute the present invention.

According to the present invention, it is possible to improve the usability after the indicator is moved to the eye gaze input position based on the user's eye gaze and the predetermined operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-230917, filed Dec. 20, 2019, which is hereby incorporated by reference herein in its entirety.

What is claimed is:

1. An electronic apparatus comprising at least one memory and at least one processor, the at least one processor functioning as:
    a detection unit configured to detect an eye gaze of a user; and
    a control unit configured to control a movement of an indicator in response to an operation performed on an operation unit,
    wherein the control unit performs control to move the indicator to a position based on an eye gaze position detected by the detection unit in response to an operation on the operation unit that satisfies a first condition,
    wherein, after moving the indicator to the position based on the eye gaze position, the control unit performs control not to move the indicator in response to an operation performed on the operation unit that satisfies the first condition but does not satisfy a second condition, and the control unit performs control to move the indicator by a movement amount corresponding to an operation amount in response to an operation performed on the operation unit that satisfies the second condition, and
    wherein the control unit switches a condition of an operation on the operation unit for moving the indicator between the first condition and the second condition depending on whether the indicator has been moved to the position based on the eye gaze position.

2. The electronic apparatus according to claim 1, wherein the second condition is an end of a continuous operation performed on the operation unit.

3. The electronic apparatus according to claim 1, wherein the second condition is that the operation amount on the operation unit per unit time is smaller than or equal to a predetermined value.

4. The electronic apparatus according to claim 1, wherein the second condition is at least one of a temporary stop of the operation and an end of the operation.

5. The electronic apparatus according to claim 1, wherein the control unit performs control to move the indicator from a position of the indicator before the movement by the movement amount corresponding to the operation amount on the operation unit irrespective of the position based on the eye gaze position in a case where the operation performed on the operation unit does not satisfy the first condition and where the indicator has not been moved to the position based on the eye gaze position.

6. The electronic apparatus according to claim 1, wherein the first condition is an operation performed on the operation unit by a predetermined amount or more.

7. The electronic apparatus according to claim 1, wherein the first condition is at least one of a reciprocating operation of switching an operation direction a predetermined number of times or more, a movement operation with the operation continued for a predetermined time or longer, and a hold-down operation.

8. The electronic apparatus according to claim 1, wherein the control unit moves the indicator to the position based on the eye gaze position irrespective of the operation amount on the operation unit in the case where the operation on the operation unit satisfies the first condition.

9. The electronic apparatus according to claim 1, wherein the indicator is an indicator for selecting a display item displayed on a display unit.

10. The electronic apparatus according to claim 1, wherein the indicator is an indicator for specifying a position based on which predetermined processing is performed.

11. The electronic apparatus according to claim 10, wherein the predetermined processing is at least one of automatic focus (AF) processing, image processing, and processing for executing a program.

12. The electronic apparatus according to claim 1, wherein, after moving the indicator to the position based on the eye gaze position, the control unit performs control to change a display mode of the indicator between before and after the operation performed on the operation unit satisfies the second condition.

13. The electronic apparatus according to claim 1, wherein the operation unit is at least one of a mouse, a touch operation unit on which a touch operation can be performed, a pointing device that can be operated in a space, and an arrow key that can be operated in four directions.

14. The electronic apparatus according to claim 1, wherein the control unit performs control to display the position based on the eye gaze position detected by the detection unit on a display unit.

15. A method for controlling an electronic apparatus comprising:
    detecting an eye gaze of a user; and
    controlling a movement of an indicator in response to an operation on an operation unit,
    wherein the controlling moves the indicator to a position based on an eye gaze position detected by the detecting in response to an operation on the operation unit that satisfies a first condition,
    wherein, after moving the indicator to the position based on the eye gaze position, the controlling does not move the indicator in response to an operation performed on the operation unit that satisfies the first condition but does not satisfy a second condition,
    wherein, after moving the indicator to the position based on the eye gaze position the controlling moves the indicator by a movement amount corresponding to an operation amount in response to an operation performed on the operation unit that satisfies the second condition, and
    wherein the controlling switches a condition of an operation on the operation unit for moving the indicator between the first condition and the second condition depending on whether the indicator has been moved to the position based on the eye gaze position.

16. A non-transitory computer-readable storage medium storing a program for causing a computer to execute a method for controlling an electronic apparatus that comprises:
    detecting an eye gaze of a user; and
    controlling a movement of an indicator in response to an operation on an operation unit,
    wherein the controlling moves the indicator to a position based on an eye gaze position detected by the detecting in response to an operation on the operation unit that satisfies a first condition,
    wherein, after moving the indicator to the position based on the eye gaze position, the controlling does not move the indicator in response to an operation performed on the operation unit that satisfies the first condition but does not satisfy a second condition,
    wherein, after moving the indicator to the position based on the eye gaze position, the controlling moves the indicator by a movement amount corresponding to an operation amount in response to an operation performed on the operation unit that satisfies the second condition, and wherein the controlling switches a condition of an operation on the operation unit for moving the indicator between the first condition and the second condition depending on whether the indicator has been moved to the position based on the eye gaze position.

17. The electronic apparatus according to claim 1, wherein the control unit switches the condition of the operation on the operation unit for moving the indicator from the first condition to the second condition in response to the control unit performing control to move the indicator to the position based on the eye gaze position.

18. The electronic apparatus according to claim 17, wherein the control unit switches the condition of the operation on the operation unit for moving the indicator from the second condition to the first condition in response to the operation performed on the operation unit that satisfies the second condition.

* * * * *